Sept. 22, 1931.　　　　R. SCHWAAR　　　　1,824,691

DEVICE FOR ADJUSTING THE PALLET STONES IN ESCAPEMENT LEVERS

Filed April 28, 1930

R. Schwaar
INVENTOR

By Marks & Clerk
Attys.

Patented Sept. 22, 1931

1,824,691

UNITED STATES PATENT OFFICE

RENÉ SCHWAAR, OF BIENNE, SWITZERLAND

DEVICE FOR ADJUSTING THE PALLET STONES IN ESCAPEMENT LEVERS

Application filed April 28, 1930, Serial No. 448,083, and in Switzerland May 4, 1929.

The present invention relates to a device for adjusting the pallet stones in escapement levers. In manufacturing the single parts of watch movements the escapement levers require special attention. These levers are not, as is sometimes usual, adjusted every one particularly as belonging to one particular watch but are adjusted independently of any particular watch so as to be all congruent with one and the same pattern the supposition being made that all movements which are to receive said levers be so well finished as to be exactly uniform. According to this latter system of manufacturing all levers are first roughly finished but still provided with a pallet staff and with the stones provisorily set and sealed. The levers receive their final finish on separate machines and the device according to the present invention is intended to adjust the provisorily set stones in the pallet into their final and true position.

The device comprises therefore firstly a clamping device adapted to present the pallets to the tool all in the same position, secondly a heating device for softening the sealing of the provisorily set stones and thirdly two manually operated slides having an adjustable predetermined stroke for pushing the stones into their final and true position.

The drawings represent a working example of the objects of the invention.

Figure 1:
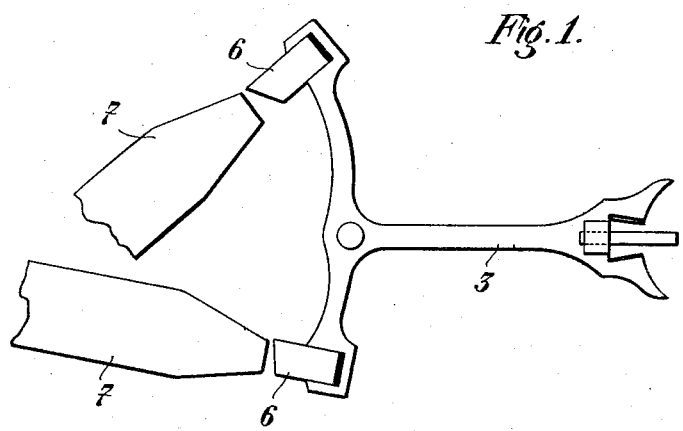
Fig. 1 is an enlarged view of a pallet showing the slides for adjusting the pallet stones.
Figure 2:
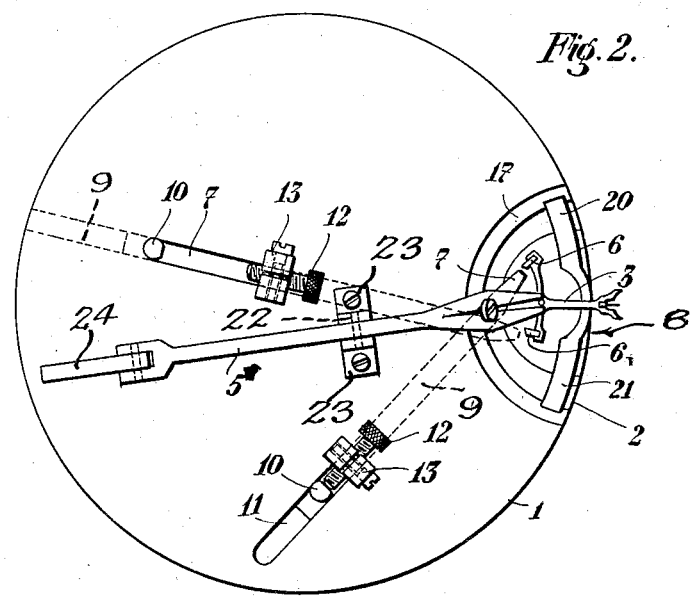
Fig. 2 is a plan of the general arrangement.
Figure 3:
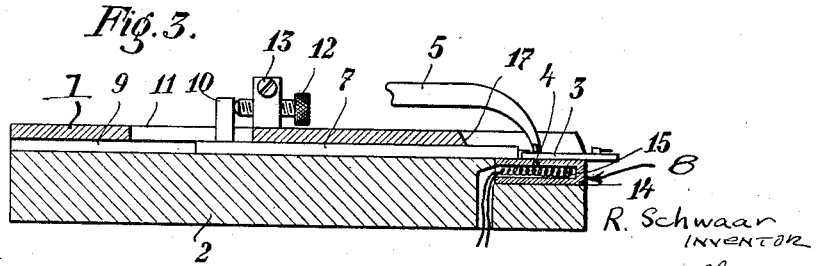

Fig. 3 a vertical and nearly central section through a base plate as a rest showing a slide and its guide and the clamping and fixing of the pallet with the heating body.

The device according to the present invention is mounted on a rest comprising an upper and a lower plate 1 and 2. The pallet 3 is held in position by means of the pivot pin fixed thereto. This pivot pin is inserted into a hole 4 of the lower plate 2 and the pallet is maintained therein by means of a clamping lever 5 arranged pivotally on the upper plate 1. Laterally the pallet is clamped by means of a stationary and an adjustable jaw 20, 21, so that pallets of different sizes may be always clamped fast in the same position. The pallet stones 6 inserted into the settings of the pallet arms and sealed thereto are not yet exactly in their true and final position. The present invention relates to means for adjusting the stones to their true and final position.

The means consist in manually operated slides 7 and in a heating body 8 provided underneath the station of the pallet. The guides 9 for the slides 7 are cut into the underside of the upper plate 1 and alined with the axes of the notches for the stones. Therefore the paths of the said slides are crossing each other before they meet the stones. The slides project with a handle 10 through slots 11 of the upper plate and may therefore be directed by hand. The movements of these slides are checked at one end by the end of the slot 11 and at the other end by a screw 12 which is adjustably held in a clamp 13 attached to plate 1 and stops the advance of the handle 10.

The heating body 8 is a hollow semicircular casing 14 fitted into the plate 2 and enclosing a heating element 15. The hole 4 for the pivot pin or staff of the pallet is provided in the upper wall of the hollow casing. The portion of the plate 2 occupied by said casing is left free by the cut out 17 of the upper plate 1 so that, a lever 5 mounted pivotally on this plate and extended into this cut out is capable of maintaining the pallet with its pin inserted within the hole 4, while two horizontally moving and hand operated jaws 20, 21 clamp the stem of the pallet laterally fast. Lever 5 is pivoted by means of a cross pin 22 held between two lugs 23 and is clamped fast by means of hand lever 24 provided with an eccentric. In a similar way the curved lateral claws 20, 21 moving in corresponding curved guides are clamped fast by means of eccentric levers. The clamping arrangement of these clamps do not form part of this invention. The pallet could also be held fast by other means.

The device is managed as follows:

After having fixed the pallet in a predetermined position by means of the lever 5 the jaws 20, 21 and the hole 4 a heating resistance (not shown) of the heating body 8 is energized. This may be done by means of an automatic switch which interrupts the current after a predetermined time.

After having raised the temperature of the plate sufficiently for softening the shellac used for sealing the stones the slides 7 are pushed forward against the screw 12 whereby the stones will be brought into their true position.

What I claim as new is:

In a device for adjusting pallet stones in escapement levers from a provisory into their true and final position the combination of a rest made with an upper and a lower plate the latter having a semicircular portion left free by a cut out of the upper plate, a heating device comprising a casing containing the heating element and fitted into the free portion of the lower plate, means capable of maintaining the lever always in the same position on said casing, manually operated slides arranged to move in line with the axes of the notches of the stones, and adjustable stops adapted to cooperate with the slides so as to adjust all stones into the same position.

In testimony whereof I affix my signature.

RENÉ SCHWAAR.